United States Patent
Piemontesi et al.

(10) Patent No.: US 12,286,504 B2
(45) Date of Patent: Apr. 29, 2025

(54) CATALYST COMPONENTS FOR THE POLYMERIZATION OF OLEFINS

(71) Applicant: BASELL POLIOLEFINE ITALIA S.R.L., Milan (IT)

(72) Inventors: Fabrizio Piemontesi, Ferrara (IT); Alessandro Mignogna, Ferrara (IT); Dario Liguori, Ferrara (IT); Giampiero Morini, Ferrara (IT); Tiziano Dall'Occo, Ferrara (IT); Gianni Vitale, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 572 days.

(21) Appl. No.: 17/642,460

(22) PCT Filed: Aug. 27, 2020

(86) PCT No.: PCT/EP2020/073984
§ 371 (c)(1),
(2) Date: Mar. 11, 2022

(87) PCT Pub. No.: WO2021/052733
PCT Pub. Date: Mar. 25, 2021

(65) Prior Publication Data
US 2022/0298272 A1  Sep. 22, 2022

(30) Foreign Application Priority Data
Sep. 17, 2019 (EP) .................... 19197698

(51) Int. Cl.
*C08F 4/76* (2006.01)
*C08F 4/654* (2006.01)
*C08F 10/06* (2006.01)

(52) U.S. Cl.
CPC .............. *C08F 4/6543* (2013.01); *C08F 4/76* (2013.01); *C08F 10/06* (2013.01); *C08F 2500/12* (2013.01); *C08F 2500/15* (2013.01); *C08F 2500/17* (2013.01); *C08F 2500/27* (2021.01); *C08F 2500/30* (2021.01); *C08F 2500/31* (2021.01); *C08F 2500/35* (2021.01)

(58) Field of Classification Search
None
See application file for complete search history.

(56) References Cited

U.S. PATENT DOCUMENTS

| | | | |
|---|---|---|---|
| 4,399,054 A | 8/1983 | Ferraris et al. | |
| 4,469,648 A | 9/1984 | Ferraris et al. | |
| 2012/0302709 A1 | 11/2012 | Guidotti et al. | |
| 2013/0331529 A1* | 12/2013 | Kersting | C08F 10/00 502/169 |
| 2014/0275451 A1 | 9/2014 | Chang | |
| 2015/0266981 A1* | 9/2015 | Mignogna | C08F 10/06 502/154 |

FOREIGN PATENT DOCUMENTS

| | | |
|---|---|---|
| CN | 1268957 A | 10/2000 |
| CN | 101910208 A | 12/2010 |
| CN | 103476806 A | 12/2013 |
| CN | 104995221 A | 10/2015 |
| CN | 106170500 A | 11/2016 |
| CN | 107949587 A | 4/2018 |
| CN | 108570120 A | 9/2018 |
| EP | 0361494 A2 | 4/1990 |
| EP | 0728769 A1 | 8/1996 |
| EP | 2712875 A1 | 4/2014 |
| JP | 2010248469 A | 11/2010 |
| KR | 1020180044341 | 5/2018 |
| WO | 2011160936 A1 | 12/2011 |
| WO | 2017042058 A1 | 3/2017 |

OTHER PUBLICATIONS

International Search Report and Written Opinion Mailed Dec. 23, 2020 (Dec. 23, 2020) For Corresponding PCT/EP2020/073984.

* cited by examiner

*Primary Examiner* — Richard A. Huhn

(57) ABSTRACT

A solid catalyst component for the polymerization of olefins made from or containing a magnesium halide, a titanium compound having at least a Ti-halogen bond, a first electron donor compound selected from 1,3 diethers (DE), and a second electron donor compound selected from dicarbamates (DC), wherein the first and second electron donor compounds are present in a molar ratio DE:DC ranging from 4.5:1 to 20:1.

14 Claims, No Drawings

CATALYST COMPONENTS FOR THE POLYMERIZATION OF OLEFINS

This application is the U.S. National Phase of PCT International Application PCT/EP2020/073984, filed Aug. 27, 2020, claiming benefit of priority to European Patent Application No. 19197698.4, filed Sep. 17, 2019, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to Ziegler-Natta heterogeneous catalyst components for the polymerization of olefins.

BACKGROUND OF THE INVENTION

In some instances, the Ziegler-Natta polypropylene catalysts are based on phthalate diesters as internal donors used in combination with an aluminum alkyl cocatalyst and with alkylalkoxysilanes as selectivity control agents (external donors). In some instances, these catalysts with high porosity are used to prepare impact resistant propylene. In some instances, impact resistant propylene polymer compositions are made from or containing a high crystallinity propylene polymer fraction insoluble in xylene at 25° C. and a low crystallinity copolymer fraction being soluble in xylene at 25° C. As used herein, propylene polymer compositions made from or containing two different polymers of different crystallinity are referred to as "heterophasic copolymers." In some instances, the high crystallinity fraction is made from or containing a propylene homopolymer, or a random propylene copolymer with a low amount of olefin comonomer, characterized by high isotacticity. In some instances, the low crystallinity fraction is made from or containing a propylene copolymer. In some instances, the compositions are prepared as a mechanical blend of the two components or in a sequential polymerization in one or two reactors.

SUMMARY OF THE INVENTION

In a general embodiment, the present disclosure provides a solid catalyst component for the polymerization of olefins made from or containing a magnesium halide, a titanium compound having at least a Ti-halogen bond, a first electron donor compound selected from 1,3 diethers (DE), and a second electron donor compound selected from dicarbamates (DC), wherein the first and second electron donor compounds are present in a molar ratio DE:DC ranging from 4.5:1 to 20:1.

DETAILED DESCRIPTION OF THE INVENTION

In some embodiments, the DE:DC molar ratio ranges from 5:1 to 15:1, alternatively from 7:1 to 10:1.

In some embodiments, the molar ratio between total amounts of donors (DE+DC) and the Ti atoms (DE+DC):Ti ranges from 0.3:1 to 1:1, alternatively from 0.4:1 to 1:1.

In some embodiments, the solid catalyst component has a porosity of at least 0.150 cm³/g, wherein the porosity is measured according to a mercury method based on the solid catalyst components having pores with radius equal to or less than 1 μm. In some embodiments, the porosity ranges from 0.20 to 0.5 cm³/g.

In some embodiments, the dicarbamates have formula (I):

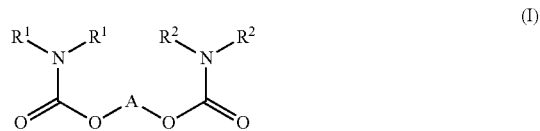

wherein $R^1$ and $R^2$, independently, are selected from hydrogen and $C_1$-$C_{15}$ hydrocarbon groups, optionally contain a heteroatom selected from halogen, P, S, N, O and Si, which can be fused together to form one or more cycles and A is a bivalent bridging group.

In some embodiments, A is a bivalent bridging group with chain length between the two bridging bonds being 1-10 atoms. As used herein and in case of cyclic structures acting as bridging groups, the term "chain length" refers to the shortest sequence of atoms bridging the oxygen atoms of formula (I). In some embodiments, the bridging group has formula —($ZR^3m$)n- wherein independently, Z is selected from C, Si, Ge, O, N, S or P, the $R^3$ groups, equal to or different from each other, are hydrogen or a $C_1$-$C_{20}$ hydrocarbon radicals, optionally containing a heteroatom selected from halogen, P, S, N, O and Si, which can be fused together to form one or more cycles, m is a number satisfying the valences of Z and n is an integer ranging from 1 to 10. In some embodiments and in the bridging group has formula —($ZR^3m$)n-, the atoms O, S, and N are not directly linked to the oxygen of formula (I), that is, the atoms O, S, and N are not the terminal atoms of the bridging group. In some embodiments, Z is selected from C and Si. In some embodiments, Z is carbon.

In some embodiments, the bivalent bridging group is selected from the group consisting of aliphatic, alicyclic and aromatic bivalent radicals, optionally substituted with $C_1$-$C_{15}$ hydrocarbon groups and/or with heteroatoms selected from halogen, P, S, N, O and Si, and having a bridging chain length ranging from 1 to 6 atoms, alternatively from 1 to 4 atoms.

In some embodiments, the bridging group is an aliphatic or alicyclic bridging group having a bridging chain length of 2-3 carbon atoms. In some embodiments, the bridging groups have the formula —($CR^4p$)s-, wherein $R^4$ is, independently, hydrogen or a $C_1$-$C_{20}$ hydrocarbon radicals, optionally substituted with heteroatoms selected from halogen, P, S, N, O and Si, which can be fused together to form one or more cycles, p is a number satisfying the available valence of carbon and s is a number from 1 to 6, alternatively from 1 to 4. In some embodiments, the bridging groups are selected from the group consisting of methylidene, 4-ethane-1,2-diyl, butane-2,3-diyl, pentane-2,4-diyl, 2,2-diisobutyl-propane-1,3-diyl, cyclohexane-1,2-diyl, and cyclopentane-1,2-diyl.

In some embodiments, the bridging group is based on cyclic aromatic groups. In some embodiments, the cyclic aromatic groups link the two oxygen of formula (I) through the carbon ring atoms. In some embodiments, the cyclic aromatic groups are phenyl groups, optionally substituted with halogens or $C_1$-$C_{20}$ alkyl radicals, bridging the oxygen atoms in position 1,2 or 1,3 or 1,4 or naphthalene groups, optionally substituted bridging the oxygen groups in position 1,2 or, 2,3 or, 1,8. In some embodiments, the cyclic aromatic groups have the structure of formula (II):

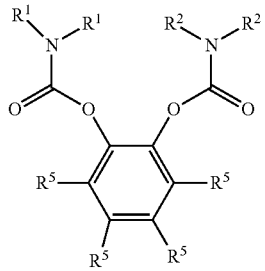

wherein R¹ and R² have the same meaning previously specified, and R⁵, independently, is selected from hydrogen, halogens or $C_1$-$C_{15}$ hydrocarbon groups optionally substituted with heteroatoms selected from halogen, P, S, N, O and Si, with the proviso that at least one of R⁵ is different from hydrogen.

In some embodiments, the R⁵ groups in position 3, 5 and/or 6 are $C_1$-$C_5$ alkyl groups. In some embodiments, the substitution in position 3 is with a primary alkyl group and in position 5 is with a tertiary alkyl group. In some embodiments, the primary alkyl group is methyl. In some embodiments, the tertiary alkyl group is tert-butyl.

In some embodiments, the cyclic aromatic groups are selected from the group consisting of 1,2-phenylene, 3-methyl-1,2-phenylene, 4-chloro-1,2-phenylene, 4-(tert-butyl)-1,2-phenylene, 3,6-dimethyl-1,2-phenylene, 3,5-dimethyl-1,2-phenylene, 5-(tert-butyl)-3-methyl-1,2-phenylene, 3,5-diisopropyl-1,2-phenylene, naphthalene-1,8-diyl, naphthalene-1,2-diyl, naphthalene-2,3-diyl groups.

In some embodiments and in the formulas (I) and (II), the R¹-R² groups are independently selected from hydrogen, $C_1$-$C_{15}$ alkyl groups, $C_6$-$C_{14}$ aryl groups, $C_3$-$C_{15}$ cycloalkyl groups, and $C_7$-$C_{15}$ arylalkyl or alkylaryl groups. In some embodiments, R¹ and R² are selected from hydrogen or $C_1$-$C_{10}$ alkyl groups, alternatively from hydrogen or $C_1$-$C_5$ alkyl groups. In some embodiments, R¹ and R² are ethyl. In some embodiments, R¹ and R² are selected from hydrogen and ethyl.

In some embodiments, the final amount of electron donor compound in the solid catalyst component ranges from 1 to 25% by weight, alternatively from 3 to 20% by weight.

In some embodiments, the dicarbamates are selected from the group consisting of 1,2-diphenylethane-1,2-diyl dicarbamate, 1-phenylbutane-1,2-diyl dicarbamate, 1-phenylethane-1,2-diyl dicarbamate, 1-phenylpropane-1,2-diyl dicarbamate, 2,5-dimethylhexane-3,4-diyl dicarbamate, 2-methylhexane-3,4-diyl dicarbamate, 3-methyl-1-phenylbutane-1,2-diyl dicarbamate, 3-methylbutane-1,2-diyl dicarbamate, 4-methylpentane-2,3-diyl dicarbamate, butane-1,2-diyl dicarbamate, butane-2,3-diyl dicarbamate, ethane-1,2-diyl dicarbamate, hexane-3,4-diyl dicarbamate, pentane-2,3-diyl dicarbamate, propane-1,2-diyl dicarbamate, 2,5-dimethylhexane-3,4-diyl bis(dimethylcarbamate), 2-methylhexane-3,4-diyl bis(dimethylcarbamate), 3-methylbutane-1,2-diyl bis(dimethylcarbamate), 4-methylpentane-2,3-diyl bis(dimethylcarbamate), butane-1,2-diyl bis(dimethylcarbamate), butane-2,3-diyl bis(dimethylcarbamate), ethane-1,2-diyl bis(dimethylcarbamate), hexane-3,4-diyl bis(dimethylcarbamate), pentane-2,3-diyl bis(dimethylcarbamate), propane-1,2-diyl bis(dimethylcarbamate), 2,5-dimethylhexane-3,4-diyl bis(diethylcarbamate), 2-methylhexane-3,4-diyl bis(diethylcarbamate), 3-methylbutane-1,2-diyl bis(diethylcarbamate), 4-methylpentane-2,3-diyl bis(diethylcarbamate), butane-1,2-diyl bis(diethylcarbamate), butane-2,3-diyl bis(diethylcarbamate), ethane-1,2-diyl bis(diethylcarbamate), hexane-3,4-diyl bis(diethylcarbamate), pentane-2,3-diyl bis(diethylcarbamate), propane-1,2-diyl bis(diethylcarbamate), 2,5-dimethylhexane-3,4-diyl bis(diisopropylcarbamate), 2-methylhexane-3,4-diyl bis(diisopropylcarbamate), 3-methylbutane-1,2-diyl bis(diisopropylcarbamate), 4-methylpentane-2,3-diyl bis(diisopropylcarbamate), butane-1,2-diyl bis(diisopropylcarbamate), butane-2,3-diyl bis(diisopropylcarbamate), ethane-1,2-diyl bis(diisopropylcarbamate), hexane-3,4-diyl bis(diisopropylcarbamate), pentane-2,3-diyl bis(diisopropylcarbamate), propane-1,2-diyl bis(diisopropylcarbamate), 2,5-dimethylhexane-3,4-diyl bis(pyrrolidine-1-carboxylate), 2-methylhexane-3,4-diyl bis(pyrrolidine-1-carboxylate), 3-methylbutane-1,2-diyl bis(pyrrolidine-1-carboxylate), 4-methylpentane-2,3-diyl bis(pyrrolidine-1-carboxylate), butane-1,2-diyl bis(pyrrolidine-1-carboxylate), butane-2,3-diyl bis(pyrrolidine-1-carboxylate), ethane-1,2-diyl bis(pyrrolidine-1-carboxylate), hexane-3,4-diyl bis(pyrrolidine-1-carboxylate), pentane-2,3-diyl bis(pyrrolidine-1-carboxylate), propane-1,2-diyl bis(pyrrolidine-1-carboxylate), 2,5-dimethylhexane-3,4-diyl bis(diphenylcarbamate), 2-methylhexane-3,4-diyl bis(diphenylcarbamate), 3-methylbutane-1,2-diyl bis(diphenylcarbamate), 4-methylpentane-2,3-diyl bis(diphenylcarbamate), butane-1,2-diyl bis(diphenylcarbamate), butane-2,3-diyl bis(diphenylcarbamate), ethane-1,2-diyl bis(diphenylcarbamate), hexane-3,4-diyl bis(diphenylcarbamate), pentane-2,3-diyl bis(diphenylcarbamate), propane-1,2-diyl bis(diphenylcarbamate), cyclohexane-1,2-diyl bis(pyrrolidine-1-carboxylate), cyclohexane-1,2-diyl bis(diethylcarbamate), cyclohexane-1,2-diyl bis(diisopropylcarbamate), cyclohexane-1,2-diyl bis(dimethylcarbamate), cyclohexane-1,2-diyl bis(diphenylcarbamate), cyclohexane-1,2-diyl dicarbamate, 2,3-dimethylbutane-2,3-diyl bis(pyrrolidine-1-carboxylate), 2,3-dimethylbutane-2,3-diyl bis(diethylcarbamate), 2,3-dimethylbutane-2,3-diyl bis(diisopropylcarbamate), 2,3-dimethylbutane-2,3-diyl bis(dimethylcarbamate), 2,3-dimethylbutane-2,3-diyl bis(diphenylcarbamate), 2,3-dimethylbutane-2,3-diyl dicarbamate, pentane-2,4-diyl bis(pyrrolidine-1-carboxylate), pentane-2,4-diyl bis(diethylcarbamate), pentane-2,4-diyl bis(diisopropylcarbamate), pentane-2,4-diyl bis(dimethylcarbamate), pentane-2,4-diyl bis(diphenylcarbamate), pentane-2,4-diyl dicarbamate, propane-1,3-diyl bis(pyrrolidine-1-carboxylate), pentane-2,4-diyl bis(dimethylcarbamate), pentane-2,4-diyl dicarbamate, propane-1,3-diyl bis(diethylcarbamate), propane-1,3-diyl bis(diisopropylcarbamate), propane-1,3-diyl bis(diphenylcarbamate), 2,2-dimethylpropane-1,3-diyl bis(pyrrolidine-1-carboxylate), 2,2-dimethylpropane-1,3-diyl bis(diethylcarbamate), 2,2-dimethylpropane-1,3-diyl bis(diisopropylcarbamate), 2,2-dimethylpropane-1,3-diyl bis(dimethylcarbamate), 2,2-dimethylpropane-1,3-diyl bis(diphenylcarbamate), 2,2-dimethylpropane-1,3-diyl dicarbamate, 2,2-diisopropylpropane-1,3-diyl bis(pyrrolidine-1-carboxylate), 2,2-diisopropylpropane-1,3-diyl bis(diethylcarbamate), 2,2-diisopropylpropane-1,3-diyl bis(diisopropylcarbamate), 2,2-diisopropylpropane-1,3-diyl bis(dimethylcarbamate), 2,2-diisopropylpropane-1,3-diyl bis(diphenylcarbamate), 2,2-diisopropylpropane-1,3-diyl dicarbamate, 2,2-diisobutylpropane-1,3-diyl bis(pyrrolidine-1-carboxylate), 2,2-diisobutylpropane-1,3-diyl bis(diethylcarbamate), 2,2-diisobutylpropane-1,3-diyl bis(diisopropylcarbamate), 2,2-diisobutylpropane-1,3-diyl bis(dimethylcarbamate), 2,2-diisobutylpropane-1,3-diyl bis(diphenylcarbamate), 2,2-diisobutylpropane-1,3-diyl dicarbamate, (9H-fluorene-9,9-diyl)bis(methylene) bis(pyrrolidine-1-carboxylate), (9H-fluorene-9,9-diyl)bis(methylene) bis(diethylcarbamate), (9H-fluorene-9,9-diyl)bis(methylene) bis(diisopropylcarbamate), (9H-fluorene-9,9-diyl)bis(methylene) bis(diphenylcarbamate), pentane-2,4-diyl bis(dimethylcarbamate), pentane-2,4-diyl dicarbamate, (diethylsilanediyl)bis(methylene) bis(diethylcarbamate), (dimethylsilanediyl)bis(methylene) bis(diethylcarbamate), (ethyl(methyl)silanediyl)bis(methylene) bis(diethylcarbamate), (isobutyl(methyl)silanediyl)bis(methylene) bis(diethylcarbamate), 2-(hydroxymethyl)phenol bis(pyrrolidine-1-carboxylate), 2-(hydroxymethyl)phenol bis(diethylcarbamate), 2-(hydroxymethyl)phenol bis(diisopropylcarbamate), 2-(hydroxymethyl)phenol bis(dimethylcarbamate), 2-(hydroxymethyl)phenol bis(diphenylcarbamate), 2-(hydroxymethyl)phenol dicarbamate, 2,3-diisopropylbutane-1,4-diyl bis(pyrrolidine-1-carboxylate), 2,3-diisopropylbutane-1,4-diyl bis(diethylcarbamate), 2,3-diisopropylbutane-1,4-diyl bis(diisopropylcarbamate), 2,3-diisopropylbutane-1,4-diyl bis(dimethylcarbamate), 2,3-diisopropylbutane-1,4-diyl bis(diphenylcarbamate), 2,3-diisopropylbutane-1,4-diyl dicarbamate, [1,1'-biphenyl]-2,2'-diyl bis(pyrrolidine-1-carboxylate), [1,1'-biphenyl]-2,2'-diyl bis(diethylcarbamate), [1,1'-biphenyl]-2,2'-diyl bis(diisopropylcarbamate), [1,1'-biphenyl]-2,2'-diyl bis(dimethylcarbamate), [1,1'-biphenyl]-2,2'-diyl bis(diphenylcarbamate), [1,1'-biphenyl]-2,2'-diyl dicarbamate, 1,2-phenylenebis(methylene) bis(pyrrolidine-1-carboxylate), 1,2-phenylenebis(methylene) bis(diethylcarbamate), 1,2-phenylenebis(methylene) bis(diisopropylcarbamate), 1,2-phenylenebis(methylene) bis(dimethylcarbamate), 1,2-phenylenebis(methylene) bis(diphenylcarbamate), 1,2-phenylenebis(methylene) dicarbamate, 1,2-phenylene bis(pyrrolidine-1-carboxylate), 1,2-phenylene bis(diethylcarbamate), 1,2-phenylene bis(diisopropylcarbamate), 1,2-phenylene bis(dimethylcarbamate), 1,2-phenylene bis(diphenylcarbamate), 1,2-phenylene dicarbamate, 3-methyl-1,2-phenylene bis(pyrrolidine-1-carboxylate), 3-methyl-1,2-phenylene bis(diethylcarbamate), 3-methyl-1,2-phenylene bis(diisopropylcarbamate), 3-methyl-1,2-phenylene bis(dimethylcarbamate), 3-methyl-1,2-phenylene bis(diphenylcarbamate), 3-methyl-1,2-phenylene dicarbamate, 3,5-dimethyl-1,2-phenylene bis(pyrrolidine-1-carboxylate), 3,5-dimethyl-1,2-phenylene bis(diethylcarbamate), 3,5-dimethyl-1,2-phenylene bis(diisopropylcarbamate), 3,5-dimethyl-1,2-phenylene bis(dimethylcarbamate), 3,5-dimethyl-1,2-phenylene bis(diphenylcarbamate), 3,5-dimethyl-1,2-phenylene dicarbamate, 3,6-dimethyl-1,2-phenylene bis(pyrrolidine-1-carboxylate), 3,6-dimethyl-1,2-phenylene bis(diethylcarbamate), 3,6-dimethyl-1,2-phenylene bis(diisopropylcarbamate), 3,6-dimethyl-1,2-phenylene bis(dimethylcarbamate), 3,6-dimethyl-1,2-phenylene bis(diphenylcarbamate), 3,6-dimethyl-1,2-phenylene dicarbamate, 5-(tert-butyl)-3-methyl-1,2-phenylene bis(pyrrolidine-1-carboxylate), 5-(tert-butyl)-3-methyl-1,2-phenylene bis(diethylcarbamate), 5-(tert-butyl)-3-methyl-1,2-phenylene bis(diisopropylcarbamate), 5-(tert-butyl)-3-methyl-1,2-phenylene bis(dimethylcarbamate), 5-(tert-butyl)-3-methyl-1,2-phenylene bis(diphenylcarbamate), 5-(tert-butyl)-3-methyl-1,2-phenylene dicarbamate, 3,5-di-tert-butyl-1,2-phenylene bis(pyrrolidine-1-carboxylate), 3,5-di-tert-butyl-1,2-phenylene bis(diethylcarbamate), 3,5-di-tert-butyl-1,2-phenylene bis(diisopropylcarbamate), 3,5-di-tert-butyl-1,2-phenylene bis(dimethylcarbamate), 3,5-di-tert-butyl-1,2-phenylene bis(diphenylcarbamate), 3,5-di-tert-butyl-1,2-phenylene dicarbamate, 4-(tert-butyl)-1,2-phenylene bis(pyrrolidine-1-carboxylate), 4-(tert-butyl)-1,2-phenylene bis(diethylcarbamate), 4-(tert-butyl)-1,2-phenylene bis(diisopropylcarbamate), 4-(tert-butyl)-1,2-phenylene bis(dimethylcarbamate), 4-(tert-butyl)-1,2-phenylene bis(diphenylcarbamate), 4-(tert-butyl)-1,2-phenylene dicarbamate, 3-isopropyl-6-methyl-1,2-phenylene bis(pyrrolidine-1-carboxylate), 3-isopropyl-6-methyl-1,2-phenylene bis(diethylcarbamate), 3-isopropyl-6-methyl-1,2-phenylene bis(diisopropylcarbamate), 3-isopropyl-6-methyl-1,2-phenylene bis(dimethylcarbamate), 3-isopropyl-6-methyl-1,2-phenylene bis(diphenylcarbamate), 3-isopropyl-6-methyl-1,2-phenylene dicarbamate, 4-chloro-1,2-phenylene bis(pyrrolidine-1-carboxylate), 4-chloro-1,2-phenylene bis(diethylcarbamate), 4-chloro-1,2-phenylene bis(diisopropylcarbamate), 4-chloro-1,2-phenylene bis(dimethylcarbamate), 4-chloro-1,2-phenylene bis(diphenylcarbamate), 4-chloro-1,2-phenylene dicarbamate, naphthalene-2,3-diyl bis(diethylcarbamate), naphthalene-2,3-diyl bis(diisopropylcarbamate), naphthalene-2,3-diyl bis(dimethylcarbamate), naphthalene-2,3-diyl dicarbamate, naphthalene-1,2-diyl bis(diethylcarbamate), naphthalene-1,2-diyl bis(diisopropylcarbamate), naphthalene-1,2-diyl bis(dimethylcarbamate), naphthalene-1,2-diyl dicarbamate, naphthalene-1,8-diyl bis(diethylcarbamate), naphthalene-1,8-diyl bis(diisopropylcarbamate), naphthalene-1,8-diyl bis(dimethylcarbamate), and naphthalene-1,8-diyl dicarbamate.

In some embodiments, the 1,3-diethers (DE) have formula (III):

wherein $R^I$ and $R^{II}$ are the same or different and are hydrogen or linear or branched $C_1$-$C_{18}$ hydrocarbon groups; $R^{IV}$ groups, equal or different from each other, are hydrogen or $C_1$-$C_{18}$ hydrocarbon groups; $R^V$ groups equal or different from each other, have the same meaning of $R^{III}$ except that $R^{IV}$ groups cannot be hydrogen. In some embodiments, $R^I$ or $R^{II}$ has constituents of cyclic structures. In some embodiments, each of $R^I$ to $R^{IV}$ groups contains heteroatoms selected from halogens, N, O, S and Si.

In some embodiments, $R^{IV}$ is a 1-6 carbon atom alkyl radical, alternatively a methyl. In some embodiments, the $R^{III}$ radicals are hydrogen. In some embodiments, $R^I$ is selected from the group consisting of methyl, ethyl, propyl, and isopropyl while $R^{II}$ is selected from the group consisting of ethyl, propyl, isopropyl, butyl, isobutyl, tert-butyl, isopentyl, 2-ethylhexyl, cyclopentyl, cyclohexyl, methylcyclohexyl, phenyl and benzyl. In some embodiments, $R^I$ is hydrogen while $R^{II}$ is selected from the group consisting of ethyl, butyl, sec-butyl, tert-butyl, 2-ethylhexyl, cyclohexylethyl, diphenylmethyl, p-chlorophenyl, 1-naphthyl, and 1-decahydronaphthyl. In some embodiments, $R^I$ and $R^{II}$ are the same and selected from the group consisting of ethyl, propyl, isopropyl, butyl, isobutyl, tert-butyl, neopentyl, phenyl, benzyl, cyclohexyl, and cyclopentyl.

In some embodiments, the 1,3-diethers are selected from the group consisting of 2-(2-ethylhexyl)1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1-decahydronaphthyl)-1,3-dimethoxypropane, 2(p-tert-butylphenyl)-1,3-dimethoxypropane, 2,2-dicyclohexyl-1,3-dimethoxypropane, 2,2-diethyll-1,3-dimethoxypropane, 2,2-dipropyl-1,3-dimethoxypropane, 2,2-di-n-butyl-1,3-dimethoxypropane, 2,2-diethyll-1,3-diethoxypropane, 2,2-dicyclopentyl-1,3-dimethoxypropane, 2,2-dipropyl-1,3-diethoxypropane, 2,2-di-n-butyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimetoxypropane, 2,2-di-sec-butyl-1,3-dimetoxypropane, 2,2-di-tert-butyl-1,3-dimethoxypropane, 2,2-dineopentyl-1,3-dimethoxypropane, 2-iso-propyl-2-isopentyl-1,3-dimethoxypropane, 2-phenyl-2-benzyl-1,3-dimetoxypropane, and 2-cyclohexyl-2-cyclohexylmethyl-1,3-dimethoxypropane.

In some embodiments, the 1,3-diethers have formula (IV):

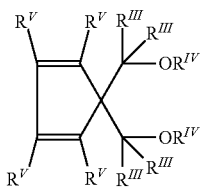

(IV)

wherein the radicals $R^{IV}$ have the same meaning explained above and the radicals $R^{III}$ and $R^V$ radicals, equal or different to each other, are selected from the group consisting of hydrogen; halogens; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ arylalkyl radicals. In some embodiments, two or more of the $R^V$ radicals are bonded to each other to form condensed cyclic structures, saturated or unsaturated, optionally substituted with $R^{VI}$ radicals. In some embodiments, $R^{VI}$ radicals are selected from the group consisting of halogens; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ arylalkyl radicals. In some embodiments, the halogens are selected from the group consisting of $C_1$ and F. In some embodiments, the radicals $R^V$ and $R^{VI}$ contain one or more heteroatoms as substitutes for carbon or hydrogen atoms, or both.

In some embodiments and in the 1,3-diethers of formulae (III) and (IV), the $R^{III}$ radicals are hydrogen, and the $R^{IV}$ radicals are methyl. In some embodiments, the 1,3-diethers of formula (II) have two or more of the $R^V$ radicals bonded to each other to form one or more condensed cyclic structures, optionally substituted by $R^{VI}$ radicals. In some embodiments, the condensed cyclic structures are benzenic. In some embodiments, the 1,3-diethers have formula (V):

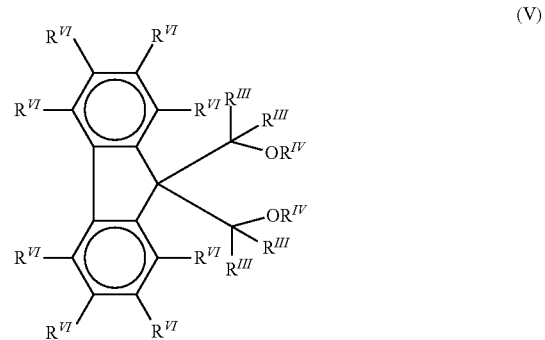

(V)

wherein the $R^{II}$ radicals equal or different are hydrogen; halogens; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ arylalkyl radicals, optionally containing one or more heteroatoms selected from the group consisting of N, O, S, P, Si and halogens, as substitutes for carbon or hydrogen atoms, or both; the radicals $R^{III}$ and $R^{IV}$ are as defined above for formula (V). In some embodiments, the halogens are selected from the group consisting of $C_1$ and F.

In some embodiments, the 1,3-diethers of formulae (IV) and (V) are selected from the group consisting of
1,1-bis(methoxymethyl)-cyclopentadiene;
1,1-bis(methoxymethyl)-2,3,4,5-tetramethylcyclopentadiene;
1,1-bis(methoxymethyl)-2,3,4,5-tetraphenylcyclopentadiene;
1,1-bis(methoxymethyl)-2,3,4,5-tetrafluorocyclopentadiene;
1,1-bis(methoxymethyl)-3,4-dicyclopentylcyclopentadiene;
1,1-bis(methoxymethyl)indene; 1,1-bis(methoxymethyl)-2,3-dimethylindene;
1,1-bis(methoxymethyl)-4,5,6,7-tetrahydroindene;
1,1-bis(methoxymethyl)-2,3,6,7-tetrafluoroindene;
1,1-bis(methoxymethyl)-4,7-dimethylindene;
1,1-bis(methoxymethyl)-3,6-dimethylindene;
1,1-bis(methoxymethyl)-4-phenylindene;
1,1-bis(methoxymethyl)-4-phenyl-2-methylindene;
1,1-bis(methoxymethyl)-4-cyclohexylindene;
1,1-bis(methoxymethyl)-7-(3,3,3-trifluoropropyl)indene;

1,1-bis(methoxymethyl)-7-trimethyilsilylindene;
1,1-bis(methoxymethyl)-7-trifluoromethylindene;
1,1-bis(methoxymethyl)-4,7-dimethyl-4,5,6,7-tetrahydroindene;
1,1-bis(methoxymethyl)-7-methylindene;
1,1-bis(methoxymethyl)-7-cyclopenthylindene;
1,1-bis(methoxymethyl)-7-isopropylindene;
1,1-bis(methoxymethyl)-7-cyclohexylindene;
1,1-bis(methoxymethyl)-7-tert-butylindene;
1,1-bis(methoxymethyl)-7-tert-butyl-2-methylindene;
1,1-bis(methoxymethyl)-7-phenylindene;
1,1-bis(methoxymethyl)-2-phenylindene;
1,1-bis(methoxymethyl)-1H-benz[e]indene;
1,1-bis(methoxymethyl)-1H-2-methylbenz[e]indene;
9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydrofluorene; and
9,9-bis(methoxymethyl)-4-tert-butylfluorene.

The catalyst component is made from or containing the first and second electron donors, a titanium compound having at least a Ti-halogen bond, and a Mg halide. In some embodiments, the titanium compounds are selected from the group consisting of $TiCl_4$ and $TiCl_3$. In some embodiments, the titanium compounds are Ti-haloalcoholates of formula $Ti(OR)_{n-y}X_y$, wherein n is the valence of titanium, y is a number between 1 and n−1, X is halogen, and R is a hydrocarbon radical having from 1 to 10 carbon atoms.

In some embodiments, the final amount of Ti atoms with respect to the total amount of catalyst component ranges from 1 to 10% wt, alternatively from 1.2 to 7% wt.

In some embodiments, the catalyst component has an average particle size ranging from 20 to 150 µm, alternatively from 40 to 100 µm.

In some embodiments, the solid catalyst component is prepared by reacting a titanium compound of formula $Ti(OR)_{n-y}X_y$, where n is the valence of titanium and y is a number between 1 and n, with a magnesium chloride deriving from an adduct of formula $MgCl_2 \cdot pROH$, where p is a number between 0.1 and 2, and R is a hydrocarbon radical having 1-18 carbon atoms. In some embodiments, the titanium compound is $TiCl_4$. In some embodiments, the reaction is carried out in the presence of the two electron donors that are added simultaneously. In some embodiments, the two electron donors are added in sequence. In some embodiments, the adduct is prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. In some embodiments, the procedure for the preparation of the spherical adducts is as disclosed in U.S. Pat. Nos. 4,399,054 and 4,469,648. In some embodiments, the resulting adduct is then subjected to thermal controlled dealcoholation (80-130° C.), thereby obtaining an adduct wherein the number of moles of alcohol is lower than 2, alternatively between 0.1 and 1.5.

In some embodiments, the reaction with the Ti compound is carried out by suspending the adduct (dealcoholated or as such) in cold $TiCl_4$. In some embodiments, cold $TiCl_4$ is at 0° C. In some embodiments, the adduct is used in an amount to have a concentration ranging from 20 to 100 g/l, alternatively from 30 to 90 g/l. In some embodiments, the 1,3-diether and the dicarbamate are added to the system at the beginning of this stage of reaction. In some embodiments, the 1,3-diether and the dicarbamate are added to the system when the temperature of the mixture is in the range of −10° to 20° C. In some embodiments, the 1,3 diether is added first. In some embodiments, the electron donors are used in amounts with consideration for the respective efficiency in being fixed on the catalyst. In some embodiments, the Mg/diether (Mg/DE) molar ratio ranges from 3:1 to 10:1, alternatively from 4:1 to 9:1. In some embodiments, the Mg/dicarbamate (Mg/DC) molar ratio ranges from 25:1 to 200:1, alternatively from 30:1 to 180:1. In some embodiments, the combined DE/DC molar ratio employed in catalyst preparation ranges from 1.5:1 to 20:1.

The temperature is then gradually raised up until reaching a temperature ranging from 90-130° C. and maintained at this temperature for 0.5-3 hours.

After completing the reaction time, stirring is stopped, the slurry is allowed to settle, and the liquid phase is removed. A second stage of treatment with $TiCl_4$ is performed. In some embodiments, the second stage of treatment is carried out at a temperature ranging from 70 to 110° C. After completing the reaction time, stirring is stopped, the slurry is allowed to settle, and the liquid phase is removed. In some embodiments, an additional reaction stage with the titanium compound is carried out. In some embodiments, an additional reaction stage is carried out with $TiCl_4$ under the same conditions described above and in the absence of electron donors. In some embodiments, the resulting solid is then washed with liquid hydrocarbon under mild conditions and then dried.

In some embodiments, the final amount of the total donors (DE+DC) in the solid catalyst component ranges from 5 to 30% wt, alternatively from 7 to 25% wt.

In some embodiments, the solid catalyst components are converted into catalysts for the polymerization of olefins by reacting the solid catalyst components with alkylaluminum compounds.

In some embodiments, the present disclosure provides a catalyst for the polymerization of olefins $CH_2=CHR$, wherein R is hydrogen or a hydrocarbyl radical with 1-12 carbon atoms, made from or containing the product obtained by contacting:
  (i) the solid catalyst component and
  (ii) an alkylaluminum compound and, optionally,
  (iii) an external electron donor compound.

In some embodiments, the alkylaluminum compound (ii) is selected from the group consisting of trialkyl aluminum compounds, alkylaluminum halides, alkylaluminum hydrides, and alkylaluminum sesquichlorides. In some embodiments, the alkylaluminum compound (ii) is a trialkyl aluminum compound selected from the group consisting of triethylaluminum, triisobutylaluminum, tri-n-butylaluminum, tri-n-hexylaluminum, and tri-n-octylaluminum. In some embodiments, the alkylaluminum compound (ii) is an alkylaluminum sesquichlorides selected from the group consisting of $AlEt_2Cl$ and $Al_2Et_3Cl_3$. In some embodiments, the alkylaluminum compound (b) is a mixture including trialkylaluminum compounds.

In some embodiments, the external electron-donor compounds (iii) are selected from the group consisting of silicon compounds, ethers, esters, amines, heterocyclic compounds, and ketones. In some embodiments, the heterocyclic compound is 2,2,6,6-tetramethylpiperidine.

In some embodiments, the external donor compounds are selected from the group consisting of silicon compounds of formula $(R_7)_a(R_8)_b Si(OR_9)_c$, where a and b are integers from 0 to 2, c is an integer from 1 to 4 and the sum (a+b+c) is 4; $R_7$, $R_8$, and $R_9$, are alkyl, cycloalkyl or aryl radicals with 1-18 carbon atoms optionally containing heteroatoms. In some embodiments, the silicon compounds are where a is 1, b is 1, c is 2, at least one of $R_7$ and $R_8$ is selected from branched alkyl, cycloalkyl or aryl groups with 3-10 carbon atoms optionally containing heteroatoms and $R_9$ is a $C_1$-$C_{10}$ alkyl group, alternatively methyl. In some embodiments, the silicon compounds are selected from the group consisting of methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)(2-ethylpiperidinyl)dimethoxysilane, and methyl(3,3,3-trifluoro-n-propyl)dimethoxysilane. In some embodiments, the silicon compounds are where a is 0, c is 3, $R_8$ is a branched alkyl or cycloalkyl group, optionally containing heteroatoms, and $R_9$ is methyl. In some embodiments, the silicon compounds are selected from the group consisting of cyclohexyltrimethoxysilane, t-butyltrimethoxysilane and thexyltrimethoxysilane.

In some embodiments, the external electron donor compound (iii) is used in an amount to give a molar ratio between the alkylaluminum compound and the electron donor compound (iii) of from 0.1:1 to 500:1, alternatively from 1:1 to 300:1, alternatively from 3:1 to 100:1.

In some embodiments, the present disclosure provides a process for the homopolymerization or copolymerization of olefins $CH_2=CHR$, wherein R is hydrogen or a hydrocarbyl radical with 1-12 carbon atoms, carried out in the presence of a catalyst made from or containing the product of the reaction between:
  (i) the solid catalyst component;
  (ii) an alkylaluminum compound and,
  (iii) optionally the electron-donor compound (external donor).

In some embodiments, the polymerization process is carried out in slurry polymerization using as diluent an inert hydrocarbon solvent, or bulk polymerization using the liquid monomer as a reaction medium. In some embodiments, the liquid monomer is propylene. In some embodiments, the polymerization process is carried out in gas-phase operating in one or more fluidized or mechanically agitated bed reactors.

In some embodiments, the catalyst it is introduced directly into the reactor. In some embodiments, the catalyst is pre-polymerized before being introduced into the first polymerization reactor. As used herein, the term "pre-polymerized" refers to a catalyst which has been subject to a polymerization step at a low conversion degree. As used herein, a catalyst is pre-polymerized when the amount the polymer produced is from about 0.1 up to about 1000 g per gram of solid catalyst component.

In some embodiments, the pre-polymerization is carried out with the α-olefins selected from the same group of olefins previously disclosed herein. In some embodiments, pre-polymerizing ethylene or mixtures thereof with one or more α-olefins occurs in an amount up to 20% by mole. In some embodiments, the conversion of the pre-polymerized catalyst component is from about 0.2 g up to about 500 g per gram of solid catalyst component.

In some embodiments, the pre-polymerization step is carried out at temperatures from 0° to 80° C., alternatively from 5° to 50° C. in liquid or gas-phase. In some embodiments, the pre-polymerization step is performed in-line as a part of a continuous polymerization process or separately in a batch process. In some embodiments, the batch pre-polymerization of the catalyst with ethylene produces an amount of polymer ranging from 0.5 to 20 g per gram of catalyst component.

In some embodiments, the polymerization is carried out at temperature of from 20 to 120° C., alternatively from 40 to 80° C. In some embodiments, the polymerization is carried out in gas-phase and the operating pressure ranges from 0.5 to 5 MPa, alternatively between 1 and 4 MPa. In some embodiments, the polymerization is carried out in bulk polymerization and the operating pressure ranges between 1 and 8 MPa, alternatively between 1.5 and 5 MPa.

In some embodiments, the alpha-olefins to polymerized are selected from the group consisting of ethylene, propylene, butene-1, 4-methyl-1-pentene and hexene-1. In some embodiments, the catalysts are used to polymerize of propylene and ethylene to prepare different kinds of products. In some embodiments, the polymer products are selected from the group consisting of high density ethylene polymers (HDPE, having a density higher than 0.940 g/cm$^3$) made from or containing ethylene homopolymers and copolymers of ethylene with alpha-olefins having 3-12 carbon atoms; linear low density polyethylenes (LLDPE, having a density lower than 0.940 g/cm$^3$) and very low density and ultra low density (VLDPE and ULDPE, having a density lower than 0.920 g/cm$^3$ to 0.880 g/cm$^3$) consisting of copolymers of ethylene with one or more alpha-olefins having from 3 to 12 carbon atoms, having a mole content of units derived from the ethylene higher than 80%; and elastomeric copolymers of ethylene and propylene and elastomeric terpolymers of ethylene and propylene with smaller proportions of a diene having a content by weight of units derived from the ethylene between about 30 and 70%.

In some embodiments, the catalysts produce high impact resistance polymer compositions made from or containing (A) a crystalline propylene homo or copolymer matrix and (B) a low crystallinity, highly soluble in xylene, propylene-ethylene based copolymer. In some embodiments, component (B) is present in an amount more than 50% wt.

In some embodiments, polymer compositions are prepared in a multistep process including at least two different polymerization stages carried out in different reactors. In some embodiments, the first step, wherein the crystalline propylene homo or copolymer is prepared, is carried out either in gas-phase or in liquid phase. In some embodiments, the gas-phase polymerization is carried out in a fluidized or stirred, fixed bed reactor or in a gas-phase reactor having two interconnected polymerization zones. The first zone operates under fast fluidization conditions. The second zone operates wherein the polymer flows under the action of gravity. In some embodiments, the liquid phase process is either in slurry, solution, or bulk (liquid monomer). In some embodiments, the bulk polymerization process is carried out in various types of reactors such as continuous stirred tank reactors, loop reactors or plug-flow reactors. In some embodiments, the first step is carried out in gas-phase. In some embodiments, the propylene polymer obtained in this stage has a xylene insolubility higher than 90%, alternatively higher than 95%, and an isotactic index in terms of content of isotactic pentads (determined with $C^{13}$-NMR on the whole polymer) higher than 93%. In some embodiments, hydrogen is used as a molecular weight regulator.

In some embodiments and in the second stage of the polymerization process, the propylene-ethylene copolymer (B) is produced in a fluidized-bed gas-phase reactor in the presence of the polymeric material and the catalyst system coming from the preceding polymerization step.

In some embodiments, the polymer produced in this stage contains from 15 to 75% wt of ethylene, optionally containing minor proportions of a diene, and is for at least 60% wt soluble in xylene at room temperature.

The following examples are given to illustrate and not to limit the scope of the disclosure itself.

Characterization

Determination of X.I.

About 2.5 grams of polymer and 250 ml of o-xylene were placed in a round-bottomed flask provided with a cooler and a reflux condenser and kept under nitrogen. The resulting mixture was heated to 135° C. and kept under stirring for about 60 minutes. The final solution was allowed to cool to 25° C. under continuous stirring. The insoluble polymer was then filtered. The filtrate was then evaporated in a nitrogen flow at 140° C. to reach a constant weight. The content of the xylene-soluble fraction is expressed as a percentage of the original 2.5 grams and the XI. % is calculated by difference to 100%.

$^{13}$C NMR of Propylene/Ethylene Copolymers

The $^{13}$C NMR spectra of random and heterophasic copolymers were acquired on a Bruker AV-600 spectrometer equipped with cryoprobe, operating at 160.91 MHz in the Fourier transform mode at 120° C.

The peak of the $S_{\beta\beta}$ carbon (nomenclature according to "Monomer Sequence Distribution in Ethylene-Propylene Rubber Measured by $^{13}$C NMR. 3. Use of Reaction Probability Mode" C. J. Carman, R. A. Harrington and C. E. Wilkes, Macromolecules, 1977, 10, 536) was used as internal reference at 29.9 ppm. The samples were dissolved in 1,1,2,2-tetrachloroethane-d2 at 120° C. with an 8% wt/v concentration. Each spectrum was acquired with a 90° pulse, 15 seconds of delay between pulses and CPD to remove 1H-13C coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150) using the following equations:

$PPP=100T_{\beta\beta}/S \quad PPE=100T_{\beta\delta}/S \quad EPE=100T_{\delta\delta}/S$ $PEP=100S_{\beta\beta}/S \quad PEE=100S_{\beta\delta}/S \quad EEE=100(0.25S_{\gamma\delta}+0.5S_{\delta\delta})/S$ Where $S=T_{\beta\beta}+T_{\beta\delta}+T_{\delta\delta}+S_{\beta\beta}+S_{\beta\delta}+0.25S_{\gamma\delta}+0.5S_{\delta\delta}$ The molar percentage of ethylene content was evaluated as:

$E\% \text{ mol}=100\times[PEP+PEE+EEE]$

The weight percentage of ethylene content was evaluated as:

$E\% \text{ wt}=100\times MW_E\times E\% \text{ mol}/(MW_E\times E\% \text{ mol}+MW_P\times P\% \text{ mol})$ where P % mol is the molar percentage of propylene content, while $MW_E$ and $MW_P$ are the molecular weights of ethylene and propylene, respectively.

Determination of Intrinsic Viscosity (I.V.)

The sample was dissolved in tetrahydronaphthalene (THN) at 135° C. and then poured into a capillary viscometer. The viscometer tube (Ubbelohde type) was surrounded by a cylindrical glass jacket; this setup allowed for temperature control with a circulating thermostatic liquid. The downward passage of the meniscus was timed by a photoelectric device.

The passage of the meniscus in front of the upper lamp started the counter which had a quartz crystal oscillator. The counter stopped as the meniscus passed the lower lamp. The efflux time was registered and converted into a value of intrinsic viscosity through Huggins' equation (Huggins, M. L., J. Am. Chem. Soc., 1942, 64, 2716), using the flow time of the pure solvent at the same experimental conditions (same viscometer and same temperature). A single polymer solution was used to determine [η].

Determination of I.V. And Ethylene Content in the Amorphous Fraction of HECO Samples The Intrinsic Viscosity (I.V.) and ethylene content of amorphous fraction of HECO samples were determined using the CRYSTEX QC apparatus (PolymerChar) equipped with the IR4 infrared detector and a capillary viscometer.

This automated fractionation method provided the relative amount of crystalline and amorphous fractions and a measure of I.V. and ethylene content on both fractions and on whole sample. A description of the technique is reported in: B. Monrabal, P. del Hierro "Soluble Fraction Analysis in Polypropylene for Quality Control Laboratories", The Application Notebook (Dec. 2, 2013) p. 709-710.

Prior to the analysis, the IR4 infrared detector (used for determination of relative amounts of Soluble and Insoluble fractions and their ethylene content) and the capillary viscometer (used to determine the I.V. of the fractions and of the whole sample) of Crystex QC apparatus were calibrated using reference samples.

About 1.3 g of polymer were transferred in the vial connected to the machine. The analysis method provided by PolymerChar was applied. 100 mL of 1,2,4-trichlorobenzene (TCB) was used as fractionation solvent. The analysis cycle included the following steps:
  (1) sample dissolution, analysis of solution concentration, I.V. and ethylene content of the sample;
  (2) crystallization at 40° C., separation of the soluble fraction and analysis for concentration, I.V. and ethylene content; and
  (3) dissolution of crystalline fraction and analysis for concentration, I.V. and ethylene content.

As the values of I.V. obtained from the analysis are determined in trichlorobenzene, the I.V. values in THN were calculated using the relation:

$I.V.(THN)=0.87\times I.V.(TCB)$

The ethylene content of the TCB soluble amorphous fraction ($C_2$ TCB-Sol) was also determined.

Determination of Donors

The content of electron donor was carried out via gas-chromatography.

Determination of Melt Flow Rate (MFR)

The melt flow rate MIL of the polymer was determined according to ISO 1133 (230° C., 2.16 Kg).

Determination of Impact Strength

Charpy impact test was according to ISO 179-1eA, e ISO 1873-2.

Determination of Flexural Modulus

Flexural Modulus was according to ISO 178, and supplemental conditions were according to ISO 1873-2.

Determination of Long Time Creep behavior

Long Time Creep behavior was evaluated according to an internal method, by measuring the flexural creep strain as a function of applied stress at constant temperature. Flexural three point bending tests were performed on rectangular specimens (12.7×120×3.1 mm) obtained by cutting injection molded plaques (250×150×3.1 mm) transversely to injection flow. Support span was 60 mm wide.

After 1 h conditioning at 23° C., the tests were performed by applying a constant load on the specimen for the length of the test and recording the curve of load application point vs. time.

Strain vs. time curves were obtained by evaluating, according to the theory of elastic beams, the nominal strain on specimen outer surface from the measured displacement and the nominal stress from the applied force.

Values of nominal stress were in the range 12-15 MPa. For each nominal stress, the time needed to reach 4% of nominal strain was taken from the strain vs. time curve of each sample.

These values were used to obtain stress vs. time graphs. The experimental points were fitted with logarithmic curves. The fitting equations were used to extrapolate the time needed to reach 4% of strain with a nominal stress of 10 MPa. These time values are reported in Table 3.

EXAMPLES

General Procedure for the Preparation of $MgCO_2 \cdot (EtOH)_m$ Adducts

An initial amount of microspheroidal $MgCl_2 \cdot 2.8C_2H_5OH$ was prepared according to the method described in Example 2 of U.S. Pat. No. 4,399,054 but operating at 3,000 rpm instead of 10,000. The resulting adduct, having an average particle size of 60 μm, was then subject to thermal dealcoholation at increasing temperatures from 30 to 130° C. operating in nitrogen current until the molar alcohol content per mol of Mg was 2.0.

Preparation of Solid Catalyst Component—General Procedure

Into a 1000 mL four-necked round flask, purged with nitrogen, 500 mL of $TiCl_4$ were introduced at 0° C. While stirring, 30 grams of the microspheroidal $MgCl_2 \cdot 2.0C_2H_5OH$ adduct were added. Then, an amount of 9,9-bis(methoxymethyl)fluorene and, successively, an amount of 5-(tert-butyl)-3-methyl-1,2-phenylene bis(diethylcarbamate) to have a Mg/DE and Mg/DC molar ratio reported in Table 1, were charged.

The temperature was raised to 100° C. and maintained for 60 minutes. After the 60 minutes, the stirring was stopped, the liquid was siphoned off, and the treatment with $TiCl_4$ was repeated at 110° C. for 30 minutes. After that time, the stirring was stopped, the liquid was siphoned off, and the treatment with $TiCl_4$ was repeated at 110° C. for 15 min. After sedimentation and siphoning of the liquid phase, the solid was washed four times with anhydrous heptane (6×100 ml) at 90° C. and twice with hexane at room temperature. The characterization of the solid catalytic component is reported in Table 1.

General Procedure for the Homo-Polymerization of Propylene in Bulk

A 4-liter steel autoclave equipped with a stirrer, pressure gauge, thermometer, catalyst feeding system, monomer feeding lines and thermostatic jacket, was purged with nitrogen flow at 70° C. for one hour. Then, at 30° C. under propylene flow, a suspension containing 75 ml of anhydrous hexane, 0.76 g of $AlEt_3$, 76 mg of dicyclopentyldimethoxysilane (D donor) and about 6 mg of solid catalyst component was charged. The autoclave was closed, and 2 NL of hydrogen was added. Then, under stirring, 1.2 kg of liquid propylene was fed. The temperature was raised to 70° C. in ten minutes. The polymerization was carried out at this temperature for two hours. At the end of the polymerization, the non-reacted propylene was removed. The polymer was recovered and dried in an oven at 80° C.

General Procedure for the Random Copolymerization of Ethylene and Propylene

A 4-liter steel autoclave equipped with a stirrer, pressure gauge, thermometer, catalyst feeding system, monomer feeding lines and thermostatic jacket, was purged with nitrogen flow at 70° C. for one hour. Then, at 30° C. under propylene flow, a suspension containing 75 ml of anhydrous hexane, 0.76 g of $AlEt_3$, 76 mg of dicyclopentyldimethoxysilane (D donor) and about 3-4 mg of solid catalyst component was charged. The autoclave was closed, and 0.9 NL of $H_2$ was added. The stirrer was started. Propylene (1.2 kg) was fed to the autoclave at 30° C. in about 2 minutes. The autoclave was warmed up to 68° C. in about 10 minutes. In the same time, 10 g of ethylene was added with a fixed feeding rate to complete the feeding as soon as the target polymerization temperature was reached. The polymerization was carried out at 70° C. for 1 hour. Ethylene was continuously added during this time to keep constant the internal autoclave pressure. At the end, the monomers were vented off. After complete venting of monomers, the polymer was recovered and dried under vacuum in an oven at 80° C.

General Procedure for the Preparation of a Heterophasic Copolymer of Propylene and Ethylene A 4-liter steel autoclave equipped with a stirrer, pressure gauge, thermometer, catalyst feeding system, monomer feeding lines and thermostatic jacket, was purged with nitrogen flow at 70° C. for one hour. Then, at 30° C. under propylene flow, a suspension containing 75 ml of anhydrous hexane, 0.76 g of $AlEt_3$, 76 mg of dicyclopentyldimethoxysilane (D donor) and about 5-16 mg of solid catalyst component (depending on the type of catalyst) was charged. The autoclave was closed. Then, an amount of hydrogen (values are collected in Tables 4a and 5a) was added. Finally, 1.2 kg of liquid propylene were fed in 2 minutes under continuous stirring. The temperature was raised to 70° C. in 10-11 minutes. The polymerization was carried out at this temperature for the time needed to reach the split (see Table 4a or 5a). At the end of this polymerization step, the non-reacted propylene was removed in about 3 minutes. During venting, the internal temperature was kept at 55-65° C. by setting the jacket temperature at 70° C.

The procedure for the gas phase reaction was then started. The content of the autoclave was warmed to the reported temperature (Table 4a or 5a). In the same time, ethylene, propylene, and hydrogen were fed (compositions collected in 4a or 5a). The feeding conditions were chosen to reach simultaneously the set internal autoclave temperature and the end of monomer feeding. This moment was defined as the starting time of gas phase copolymerization. The transition step time was about 10 minutes. The copolymerization was conducted by feeding ethylene and propylene mixture in a wt/wt ratio equal to 50% wt to keep the pressure constant at the value measured at the end of temperature increasing.

The polymerization was stopped when the target copolymer split (amount of copolymer in the final heterophasic copolymer ("HECO") sample) was obtained. This value was evaluated using the amount of monomers fed during the gas phase polymerization (experimental) and from the amount of homopolymer made in the liquid phase polymerization (estimated from catalyst mileage, determined in a separate homopolymer run, and the amount of solid catalyst component added to the autoclave.

At the end, the monomers were vented off while the autoclave was cooled down to 30° C. After complete venting of monomers, the polymer was recovered and dried under vacuum in an oven overnight at 80° C. Characterization data of the homopolymer runs as well as of the final copolymers are reported in Table 4b or 5b.

Examples 1-3 and Comparative Examples 1-4

Solid catalyst precursors of examples 1-3 (inventive) were prepared. The same procedure was adopted for solid catalyst precursors of comparative examples 1 using different amounts of donor. In comparative example 2, only diether was used. In comparative 3, the internal donor was diisobutylphthalate. In comparative example 4, diethyl 2,3-diisopropylsuccinate was used instead of the dicarbamate donor. The catalyst characterization is reported in Table 1.

TABLE 1

| | Catalyst Synthesis | | Catalyst characterization | | |
|---|---|---|---|---|---|
| Ex | Mg/DC mole ratio | Mg/DE mole ratio | Ti wt % | ID total wt % | DE/DC molar |
| 1 | 36 | 7.2 | 4.7 | 15.0 | 4.7:1 |
| 2 | 59 | 6.7 | 4.8 | 16.9 | 8.1:1 |
| 3 | 94 | 6.2 | 4.8 | 14.9 | 14:1 |
| $C_1$ | 32 | 7.1 | 4.5 | 16.0 | 4.2:1 |
| $C_2$ | — | 6.0 | 4.7 | 13.6 | — |
| $C_3$ | Mg/DIBP = 10 | | 2.7 | 11.3 | — |
| $C_4$ | Mg/Succinate = 13 Mg/DE = 26 | | 3.1 | 10.4 | — | n.d. = not determined

Bulk Polymerization of Propylene

The solid catalyst components were used for the homopolymerization of propylene in bulk phase. The results of the polymerization runs are given in Table 2 below.

TABLE 2

Results of homo-polymerization in bulk propylene

| Ex | Mileage kg/g | XI % wt | MIL g/10' |
|---|---|---|---|
| 1 | 88.1 | 99.0 | 2.3 |
| 2 | 101.5 | 98.7 | 3.5 |
| 3 | 106.5 | 98.7 | 5.2 |
| $C_1$ | 80.2 | 98.7 | 2.8 |
| $C_2$ | 88.5 | 98.3 | 7.5 |
| $C_3$ | 63.0 | 98.5 | 2.0 |
| $C_4$ | 70.0 | 98.5 | 4.5 |

External donor: D—dicyclopentyldimethoxysilane

Random Copolymerization of Ethylene and Propylene

A selection of solid catalyst components was used for the random copolymerization of ethylene and propylene.

The catalysts used, and the characterization results obtained, are listed in Table 3.

TABLE 3

Random propylene/ethylene copolymer characterization

| Catalyst of Example | Polymer type | XI % wt | MIL g/10' | Ethylene % wt | Long Time Creep behavior (1) days |
|---|---|---|---|---|---|
| 2 | | 91.5 | 0.29 | 4.3 | 2833 |
| $C_1$ | | 91.3 | 0.30 | 4.4 | 1375 |
| — | Hostalen PP H5416 | 90.6 | 1.1 | 4.4 | 1113 |

(1) Time (extrapolated value) to reach 4% of strain under 10 MPa of flexural nominal stress High Fluidity Heterophasic Polymer Composition As used herein, the term "high fluidity" refers to polymer compositions with final MFR of about 20 g/10 min or higher. The catalysts used, and the characterization results obtained, are listed in Table 4 below.

TABLE 4a

Synthesis of high fluidity heterophasic compositions

| | First Step (Propylene Polymerization) | | | Second Step (Gas Phase Copolymerization) | | | | | | | |
|---|---|---|---|---|---|---|---|---|---|---|---|
| Solid Comp | Time min | $H_2$ NL | Mileage estimated Kg/g | Temperature ° C. | Time min | Ethylene g | Propylene g | Hydrogen NL | Pressure barg | Mileage Kg/g | Split HOMO/COPO % wt |
| 1 | 30 | 10.5 | 58.1 | 70 | 74 | 58 | 106 | 3.0 | 24.7 | 89.3 | 65/35 |
| 2 | 30 | 10.0 | 62.7 | 70 | 56 | 50 | 115 | 2.5 | 23.3 | 96.5 | 65/35 |
| 3 | 30 | 9.5 | 54.2 | 70 | 123 | 50 | 115 | 5.0 | 25.1 | 79.7 | 68/32 |
| $C_1$ | 30 | 11.5 | 19.1 | 70 | 35 | 66 | 106 | 2.0 | 22.9 | 47.0 | 62/38 |
| $C_3$ | 60 | 22.0 | 43.7 | 80 | 57 | 60 | 105 | 2.0 | 22.3 | 71.6 | 61/39 |

TABLE 4b

Characterization of high fluidity heterophasic compositions

| | Characterization of Homopolymer run | | | Characterization of final composition | | | | | |
|---|---|---|---|---|---|---|---|---|---|
| | | | | | Crystex QC Soluble Fraction | | | | |
| Solid Comp | MIL g/10' | XI % wt | Ethylene % wt | MIL g/10' | XS % | Ethylene % wt | IV-THN g/dL | Charpy 23° C. kJ/mm$^2$ | Flexural Modulus N/mm$^2$ |
| 1 | 85 | 98.3 | 19.2 | 23.1 | 27.2 | 46.0 | 2.97 | 50.8 | 870 |
| 2 | 99 | 98.1 | 17.9 | 21.7 | 28.0 | 41.3 | 2.58 | 40.4 | 830 |
| 3 | 80 | 97.8 | 16.5 | 30.3 | 25.1 | 45.1 | 2.54 | 20.4 | 820 |
| C$_1$ | 110 | 98.1 | 18.0 | 29.2 | 30.9 | 44.8 | 2.38 | 12.3 | 890 |
| C$_3$ | 106 | 98.2 | 20.1 | 21.0 | 28.0 | 46.1 | 2.56 | 15.7 | 800 |

Low Fluidity Heterophasic Polymer Composition

As used herein, the term "low fluidity" refers to polymer compositions with final MFR of less than 20 g/10 min. The catalysts used, and the characterization results obtained, are listed in Table 5 below.

TABLE 5a

Synthesis of low fluidity heterophasic compositions

| | First Step (Propylene Polymerization) | | | Second Step (Gas Phase Copolymerization) | | | | | | | |
|---|---|---|---|---|---|---|---|---|---|---|---|
| Solid Comp | Time min | H$_2$ NL | Mileage estimated Kg/g | Temperature ° C. | Time min | Ethylene g | Propylene g | Hydrogen NL | Pressure barg | Mileage Kg/g | Split HOMO/COPO % wt |
| 1 | 60 | 5.8 | 66.0 | 80 | 200 | 66 | 106 | 1.60 | 20.8 | 95.7 | 31 |
| 2 | 90 | 5.3 | 55.4 | 80 | 150 | 66 | 95 | 1.10 | 19.4 | 76.9 | 28 |
| 3 | 30 | 9.5 | 53.4 | 70 | 70 | 50 | 115 | 1.75 | 22.8 | 83.5 | 36 |
| C$_1$ | 30 | 11.5 | 19.6 | 70 | 32 | 66 | 106 | 0.30 | 22.4 | 47.8 | 38 |
| C$_2$ | 90 | 4.0 | 44.1 | 80 | 51 | 66 | 106 | 0.50 | 18.0 | 60.4 | 27 |
| C$_3$ | 90 | 8.5 | 46.9 | 80 | 28 | 60 | 105 | 2.30 | 22.5 | 65.1 | 28 |

| | Characterization of Homopolymer run | | | Characterization of final composition | | | | | |
|---|---|---|---|---|---|---|---|---|---|
| | | | | | Crystex QC Soluble Fraction | | | | |
| Solid Comp | MIL g/10' | XI % wt | Ethylene % wt | MIL g/10' | XS % | Ethylene % wt | IV-THN g/dL | Charpy 23° C. kJ/mm$^2$ | Flexural Modulus N/mm$^2$ |
| 1 | 21.3 | 98.7 | 15.2 | 11.6 | 24.0 | 40.0 | 2.22 | 46.0 | 900 |
| 2 | 22.5 | 98.4 | 11.8 | 11.1 | 21.8 | 36.4 | 2.16 | 45.7 | 940 |
| 3 | 80.1 | 97.8 | 17.2 | 16.0 | 30.8 | 44.9 | 2.88 | 68.0 | 720 |
| C$_1$ | 110 | 98.1 | 19.2 | 11.8 | 29.7 | 45.9 | 4.74 | 13.0 | 880 |
| C$_2$ | 22.7 | 97.9 | 11.5 | 11.1 | 23.0 | 39.7 | 2.26 | 20.9 | 760 |
| C$_3$ | 20.2 | 98.4 | 12.9 | 10.7 | 22.9 | 41.9 | 2.18 | 30.0 | 890 |

What is claimed is:

1. A solid catalyst component for the polymerization of olefins comprising:
   (i) a magnesium halide,
   (ii) a titanium compound having at least a Ti-halogen bond,
   (iii) a first electron donor compound selected from 1,3 diethers (DE), and
   (iv) a second electron donor compound selected from dicarbamates (DC), wherein the first and second electron donor compounds are present in a molar ratio DE:DC ranging from 4.5:1 to 20:1; and
   wherein the first and second electron donor compounds are supported on the magnesium halide in active form.

2. The solid catalyst component according to claim 1, wherein the DE:DC molar ratio ranges from 5:1 to 15:1.

3. The solid catalyst component according to claim 1, wherein the DE:DC molar ratio ranges from 7:1 to 10:1.

4. The solid catalyst component according to claim 1, wherein the molar ratio between total amounts of donors DE+DC and the Ti atoms (DE+DC):Ti ratio ranges from 0.3:1 to 1:1.

5. The solid catalyst component according to claim 1 having a porosity of at least 0.150 cm$^3$/g, wherein the porosity is measured according to a mercury method based on the solid catalyst components having pores with radius equal to or less than 1 μm.

6. The solid catalyst component according to claim 1, wherein the dicarbamate has formula (I):

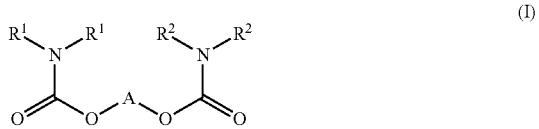

(I)

wherein $R^1$ and $R^2$, independently, are selected from hydrogen and $C_1$-$C_{15}$ hydrocarbon groups, optionally contain a heteroatom selected from halogen, P, S, N, O and Si, which can be fused together to form one or more cycles and A is a bivalent bridging group.

7. The solid catalyst component according to claim 6, wherein A is a bivalent bridging group with chain length between the two bridging bonds being 1-10 atoms.

8. The solid catalyst component according to claim 7, wherein the dicarbamate has formula (II):

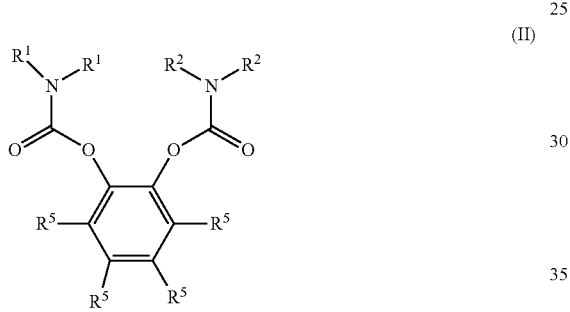

(II)

wherein $R^5$, independently, is selected from hydrogen, halogens or $C_1$-$C_{15}$ hydrocarbon groups optionally substituted with heteroatoms selected from halogen, P, S, N, O and Si, with the proviso that at least one of $R^5$ is different from hydrogen.

9. The solid catalyst component according to claim 1, wherein the 1,3-diethers have formula (III):

(III)

wherein $R^I$ and $R^{II}$ are the same or different and are hydrogen or linear or branched $C_1$-$C_{18}$ hydrocarbon groups; $R^{III}$ groups, equal or different from each other, are hydrogen or $C_1$-$C_{18}$ hydrocarbon groups; $R^{IV}$ groups equal or different from each other, have the same meaning of $R^{III}$ except that $R^{IV}$ groups cannot be hydrogen.

10. The solid catalyst component of claim 9, wherein the 1,3-diethers have formula (V):

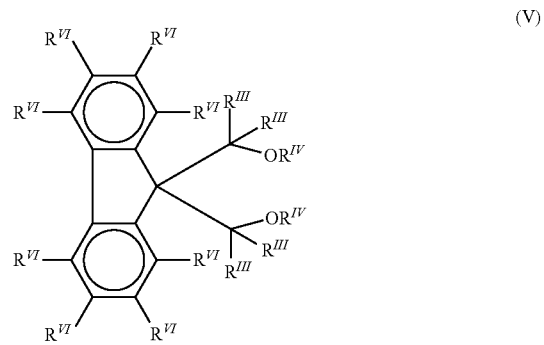

(V)

wherein the $R^{VI}$ radicals, equal or different from each other, are selected from the group consisting of hydrogen; halogens; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ arylalkyl radicals, optionally containing one or more heteroatoms selected from the group consisting of N, O, S, P, Si and halogens, as substitutes for carbon or hydrogen atoms, or both.

11. A catalyst for the polymerization of olefins CH2=CHR, wherein R is hydrogen or a hydrocarbyl radical with 1-12 carbon atoms, comprising:
the product of the reaction between:
the solid catalyst component according to claim 1 and an alkylaluminum compound.

12. The catalyst according to claim 11 further comprising an external electron donor compound.

13. The catalyst according to claim 12, wherein the external electron donor compound is selected from the group consisting of silicon compounds of formula $(R_7)a(R_8)bSi(OR_9)c$, where a and b are integers from 0 to 2, c is an integer from 1 to 4 and the sum (a+b+c) is 4; $R_7$, $R_8$, and $R_9$ are alkyl, cycloalkyl or aryl radicals with 1-18 carbon atoms optionally containing heteroatoms.

14. A process for the homopolymerization or copolymerization of olefins CH2=CHR, wherein R is hydrogen or a hydrocarbyl radical with 1-12 carbon atoms, carried out in the presence of a catalyst comprising:
the product of the reaction between:
(i) the solid catalyst component of claim 1;
(ii) an alkylaluminum compound and,
(iii) optionally an electron-donor compound (external donor).

* * * * *